(12) United States Patent
Carvell

(10) Patent No.: US 12,491,735 B2
(45) Date of Patent: Dec. 9, 2025

(54) DEVICES AND METHODS FOR CHANGING A VEHICLE TIRE

(71) Applicant: Jeremiah W. Carvell, Chicago, IL (US)

(72) Inventor: Jeremiah W. Carvell, Chicago, IL (US)

( * ) Notice: Subject to any disclaimer, the term of this patent is extended or adjusted under 35 U.S.C. 154(b) by 382 days.

(21) Appl. No.: 18/150,026

(22) Filed: Jan. 4, 2023

(65) Prior Publication Data

US 2023/0256776 A1 Aug. 17, 2023

Related U.S. Application Data

(60) Provisional application No. 63/310,272, filed on Feb. 15, 2022.

(51) Int. Cl.
*B60B 29/00* (2006.01)
*B25G 1/00* (2006.01)
*B25G 1/10* (2006.01)

(52) U.S. Cl.
CPC ............ *B60B 29/003* (2013.01); *B25G 1/005* (2013.01); *B25G 1/102* (2013.01)

(58) Field of Classification Search
CPC ................ B60B 29/003; B60B 29/005; B60B 2900/541; B25G 1/102; B25G 1/1005
USPC .................................................. 81/177.1, 75
See application file for complete search history.

(56) References Cited

U.S. PATENT DOCUMENTS

| | | | | |
|---|---|---|---|---|
| 3,973,283 | A | * | 8/1976 | Boe ........................ B60B 29/003 414/428 |
| 5,535,649 | A | * | 7/1996 | Waggle, Jr. ............. B25G 1/043 81/177.2 |
| 5,613,411 | A | | 3/1997 | Rines |
| 5,799,996 | A | * | 9/1998 | Fredrickson ............. A01B 1/20 294/51 |
| 5,910,198 | A | | 6/1999 | Maher |
| 6,748,832 | B1 | * | 6/2004 | Maxwell ............... B60B 29/003 81/124.1 |
| 8,286,535 | B1 | | 10/2012 | McCartney |
| 9,493,995 | B2 | | 11/2016 | Hamed |
| 2017/0253080 | A1 | | 9/2017 | Klien |
| 2021/0402826 | A1 | | 12/2021 | Omidi |

* cited by examiner

*Primary Examiner* — Hadi Shakeri
(74) *Attorney, Agent, or Firm* — Nixon Peabody LLP

(57) ABSTRACT

Disclosed are devices and methods for changing a vehicle wheel. The devices include an elongated shaft, a wrench portion coupled to a first end of the elongated shaft, a lever portion coupled to a second end of the elongated shaft, the lever portion including: a foot pedal configured to cause a socket to apply a first torque to a fastener; a hand grip configured to cause the socket to apply a second torque to the fastener; and a first opening and a second opening, the first opening and the second opening being configured to permit the hand of a user to grasp the hand grip. The disclosed methods include steps for using the devices to loosen and tighten lug nuts on a vehicle wheel.

16 Claims, 8 Drawing Sheets

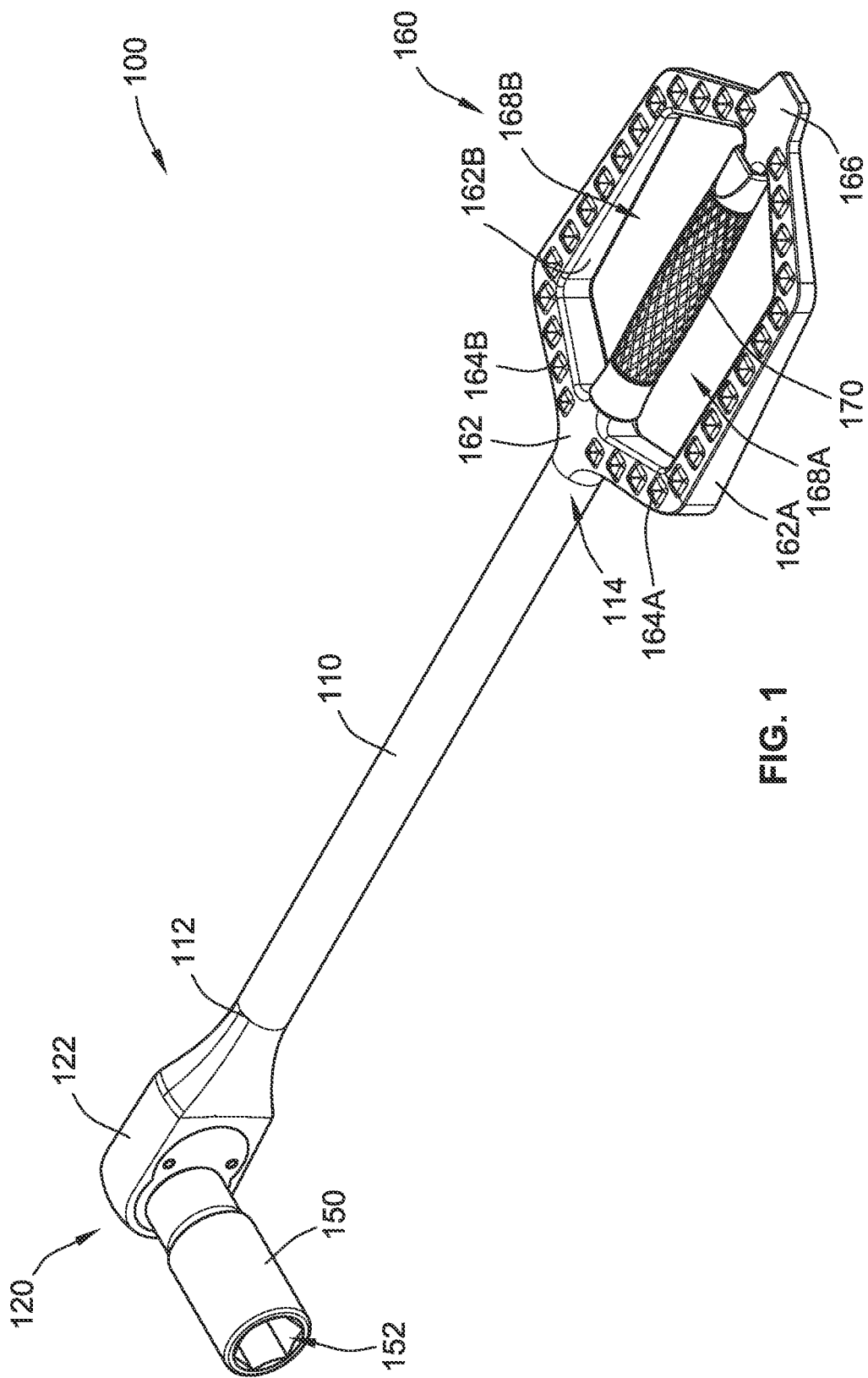

DEVICES AND METHODS FOR CHANGING A VEHICLE TIRE

CROSS-REFERENCE TO RELATED APPLICATIONS

This application claims the benefit of, and priority to, U.S. Provisional Application No. 63/310,272 filed Feb. 15, 2022, which is hereby incorporated by reference herein in its entirety.

TECHNICAL FIELD

The present disclosure relates to devices and methods for rotating fasteners. More particularly, the present disclosure relates to devices and methods for loosening lug nuts during removal of a vehicle wheel and for tightening lug nuts during installation of a vehicle wheel.

BACKGROUND

There is typically one tool that accompanies every car owner for changing a vehicle wheel: a tire iron. The typical tire iron includes four sockets separated by crossbars with each socket being designed to engage a different lug nut size. Replacing a vehicle wheel with a tire iron requires the user to exert great force by engaging the tire iron with a lug nut and applying force while grasping the tire iron. However, the force required to loosen a tightly secured lug nut may be too great for some individuals to exert via a typical tire iron. This is especially true when the lug nuts have been secured to the vehicle wheel for years because lug nuts can develop rust and other imperfections.

Because many individuals cannot exert the force necessary to rotate the lug nut, they cannot successfully change a vehicle wheel. Moreover, it may be necessary to change a wheel in an undesirable or potentially dangerous location (e.g., on the side of the road), which makes changing the wheel even more difficult. Other devices that aid changing a vehicle wheel are impractical for drivers to use because they are either too expensive or too heavy or bulky for the ordinary consumer to constantly carry in their vehicle. As a result, individuals may be stranded until a professional arrives to assist in changing the tire/wheel or to tow the vehicle to another location. There is a need for a device that allows users to more easily exert the force required to loosen a lug nut on a vehicle tire. The present disclosure is directed to providing such a device and a method of using the device for changing a vehicle tire.

SUMMARY

In general, the disclosure herein relates to a device and method of changing a vehicle wheel. The device, according to some implementation of the present disclosure, provides a simple and effective way of loosening and/or tightening lug nuts on a vehicle wheel by providing a foot pedal and a hand grip that are used to apply two separate torques onto the lug nut. The methods, according to some implementations of the present disclosure, provide steps for changing a vehicle wheel that include loosening lug nuts using a first torque and a second torque.

According to some implementations of the present disclosure, a device for changing a vehicle wheel is disclosed. The device includes an elongated shaft, a wrench portion and a lever portion. The wrench portion is coupled to a first end of the elongated shaft. The wrench portion includes a head and a socket. The socket is configured to engage a fastener. The lever portion is coupled to a second end of the elongated shaft. The lever portion includes a foot pedal, a hand grip, a first opening, and a second opening. The foot pedal includes a first portion and a second portion. The foot pedal is configured to cause the socket to apply a first torque to the fastener responsive to application of a first force to the foot pedal via a foot of a user. The hand grip has a longitudinal axis that is coincident with a longitudinal axis of the elongated shaft. The hand grip is configured to cause the socket to apply a second torque to the fastener responsive to application of a second force to the hand grip via a hand of the user. The first opening is formed between the first portion of the foot pedal and the hand grip. The second opening is formed between the second portion of the foot pedal and the hand grip. The first opening and the second opening are configured to permit the hand of the user to grasp the hand grip.

According to some implementations of the present disclosure, the head of the wrench portion includes a lever and a drive head configured to couple to the socket. The lever is moveable between a first position and a second position. According to some aspects of the present implementation, responsive to the lever being in the first position, the drive head is configured to (i) cause the socket to apply the first torque or the second torque to the fastener responsive to rotation of the elongated shaft in a first direction and (ii) permit the elongated shaft to rotate in a second direction opposite the first direction without causing rotation of the socket relative to the fastener when the socket is engaged with the fastener. According to some aspects of the present implementation, responsive to the lever being in the second position, the drive head is configured to (i) cause the socket to apply the first torque or the second torque to the fastener responsive to rotation of the elongated shaft in the second direction and (ii) permit the elongated shaft to rotate in the first direction without causing rotation of the socket relative to the fastener when the socket is engaged with the fastener.

According to some implementations of the present disclosure, the socket includes an opening configured to receive a portion of the fastener therein. A longitudinal axis of the opening is generally perpendicular to the longitudinal axis of the elongated shaft. According to some aspects of the present implementation, the device has a length measured between the longitudinal axis of the socket and the second end of the elongated shaft that is at least 11 inches to aid in preventing the lever portion of the device from contacting the vehicle wheel responsive to rotation of the elongated shaft.

According to some implementations of the present disclosure, the lever portion includes a shim configured to aid in removing a hubcap from a vehicle wheel. According to some aspects of the present implementation, the lever portion has a first end coupled to the elongated shaft and a second end opposite the first end. The shim is positioned at the second end of the lever portion.

According to some aspects of the present implementation, the lever portion has a generally hexagonal shape. According to some aspects of the present implementation, the head of the wrench portion, the elongated shaft, and the lever portion are unitary and/or monolithic. According to some aspects of the present implementation, the hand grip includes a textured surface to aid the user in gripping the hand grip to apply the second force. According to some aspects of the present implementation, the first opening and the second opening have a trapezoidal shape.

According to some implementations of the present disclosure, the first portion of the foot pedal includes a first plurality of protrusions and the second portion of the foot pedal includes a second plurality of protrusions. The first plurality of protrusions and the second plurality of protrusions are configured to aid in maintaining engagement between the foot of the user and the foot pedal to apply the first force.

According to some implementations of the present disclosure, a method for changing a vehicle wheel using a device is disclosed. The device includes an elongated shaft, a wrench portion, and a lever portion. The method includes causing a socket of the wrench portion of the device to engage a first lug nut that engages a first threaded shaft on a portion of the vehicle for coupling a first wheel to the vehicle. The method further includes applying a first force to a foot pedal of the device to cause a first torque to be applied to the first lug nut to cause the first lug nut to rotate in a first rotational direction. The method further includes applying a second force to a hand grip of the lever portion of the device to cause a second torque to be applied to the first lug nut to cause the first lug nut to be further rotated in the first rotational direction and removed from the first threaded shaft. The second force and the second torque are less than the first force and the first torque. The method further includes, subsequent to removing the first lug nut from the first threaded shaft, removing the first wheel from the vehicle. The method further includes, subsequent to the removing the first wheel, positioning a second wheel adjacent to the first threaded shaft. The method further includes, subsequent to the positioning the second wheel, positioning the first lug nut on the first threaded shaft. The method further includes causing the socket to engage the first lug nut and applying a third force to the hand grip of the device to cause a third torque to be applied to the first lug nut, thereby causing the first lug nut to rotate in a second rotational direction that is opposite the first rotational direction.

According to some implementations of the present disclosure, the method further includes, subsequent to causing the first lug nut to rotate, grasping the hand grip of the lever portion of the device by inserting a hand through a first opening and a second opening of the lever portion. According to some aspects of the present implementation, the method further includes, subsequent to applying the third force, applying a fourth force to the foot pedal to cause a fourth torque to be applied to the first lug nut, thereby causing the first lug nut to further rotate in the second rotational direction that is opposite the first rotational direction. The fourth force and the fourth torque are greater than the third force and the third torque.

According to some implementations of the present disclosure, a head of the wrench portion includes a lever and a drive head configured to couple to the socket. The lever is moveable between a first position and a second position. According to some aspects of the present implementation, the method further includes, subsequent to positioning the first lug nut on the first threaded shaft, switching the lever of the ratchet head to the second position to permit the device to rotate in the second rotational direction without causing the socket to rotate relative to the first lug nut when the socket is engaged with the first lug nut. According to some implementations of the present disclosure, the socket includes an opening configured to receive a portion of the fastener therein. A longitudinal axis of the socket is generally perpendicular to the longitudinal axis of the elongated shaft.

According to some implementations of the present disclosure, the elongated shaft includes a first end and a second end. The wrench portion is coupled to the first end of the elongated shaft. According to some aspects of the present implementation, the device has a length measured between a longitudinal axis of the socket and the second end of the elongated shaft that is at least 11 inches to aid in preventing the lever portion from contacting the vehicle wheel responsive to rotation of the elongated shaft.

According to some implementations of the present disclosure, the lever portion has a generally hexagonal shape. According to some aspects of the present implementation, the hand grip includes a textured surface to aid in preventing the hand of the user from slipping. According to some aspects of the present implementation, the first opening and the second opening have a trapezoidal shape.

According to some implementations of the present disclosure, the lever portion includes a shim configured to aid in removing a hubcap from a vehicle wheel. According to some aspects of the present implementation, the lever portion has a first end coupled to the elongated shaft and a second end opposite the first end. The shim is positioned at the second end of the lever portion. According to some aspects of the present implementation, the method further includes, prior to causing the socket of the wrench portion of the device to engage a first lug nut, engaging the shim of the lever portion with the hubcap to cause the hubcap to be removed from the vehicle wheel.

According to some implementations of the present disclosure, the first portion of the foot pedal includes a first plurality of protrusions and the second portion of the foot pedal includes a second plurality of protrusions. The first plurality of protrusions and the second plurality of protrusions are configured to aid in maintaining engagement between the foot of the user and the foot pedal to apply the first force.

According to some implementations of the present disclosure, the method further includes, subsequent to removing the first lug nut from the threaded shaft, causing the socket of the wrench portion to engage a second lug nut that engages the first threaded shaft on the portion of the vehicle to aid in coupling the first wheel to the vehicle. The method further includes applying the first force to the foot pedal to cause the first torque to be applied to the second lug nut to cause the second lug nut to rotate in the first rotational direction. The method further includes applying the second force to the hand grip to cause the second torque to be applied to the second lug nut to cause the second lug nut to be further rotated in the first rotational direction and removed from the first threaded shaft. The second force and the second torque are less than the first force and the first torque.

According to some implementations of the present disclosure, the method further includes, subsequent to removing the first lug nut from the threaded shaft, causing the socket of the wrench portion of the device to engage a second lug nut that engages the first threaded shaft on the portion of the vehicle to aid in coupling the first wheel to the vehicle. The method further includes, applying the second force to the hand grip to cause the second torque to be applied to the second lug nut to cause the second lug nut to be rotated in the first rotational direction and removed from the threaded shaft.

According to some implementations of the present disclosure, the method further includes, prior to causing a socket of the wrench portion of the device to engage a first lug nut, attaching the socket to a head of the wrench portion.

The devices and methods are disclosed herein provide effective ways to loosen and tighten a lug nut on a vehicle wheel. In addition, using the device to change a vehicle wheel provides the user a simple solution to loosen lug nuts that are tightly secured to the vehicle wheel.

BRIEF DESCRIPTION OF THE DRAWINGS

FIG. 1 is a perspective view of a device for changing a vehicle tire, according to some aspects of the present disclosure;

DETAILED DESCRIPTION

The present disclosure relates to devices for changing a vehicle wheel. One device has an elongated shaft, a wrench portion coupled to a first end of the elongated shaft, and a lever portion coupled to a second end of the elongated shaft. The wrench portion includes a head and a socket, the socket being configured to engage a fastener. The lever portion includes a foot pedal, a hand grip, a first opening and a second opening. The foot pedal is configured to cause the socket to apply a first torque to the fastener responsive to application of a first force to the foot pedal via a foot of the user. The hand grip is configured to cause the socket to apply a second torque to the fastener responsive to application of a second force to the hand grip via a hand of the user. The first opening is positioned between the hand grip and the foot pedal. The second opening is positioned between the hand grip and the foot pedal, opposite the first opening. The first opening and the second opening are configured to permit the hand of the user to grasp the hand grip. The present disclosure also relates to a method of changing a vehicle wheel using the devices disclosed herein. The method provides for a simple and effective solution of changing a vehicle wheel that eliminates the need for heavy or expensive devices. Further, the devices and corresponding methods provide the user with a way to change a vehicle wheel that is not labor intensive. Therefore, the devices for changing a vehicle wheel and the method of changing a vehicle wheel solve the problems in the industry by providing a relatively lightweight, inexpensive, and easy to use tool, or a combination thereof.

Figure 2A:
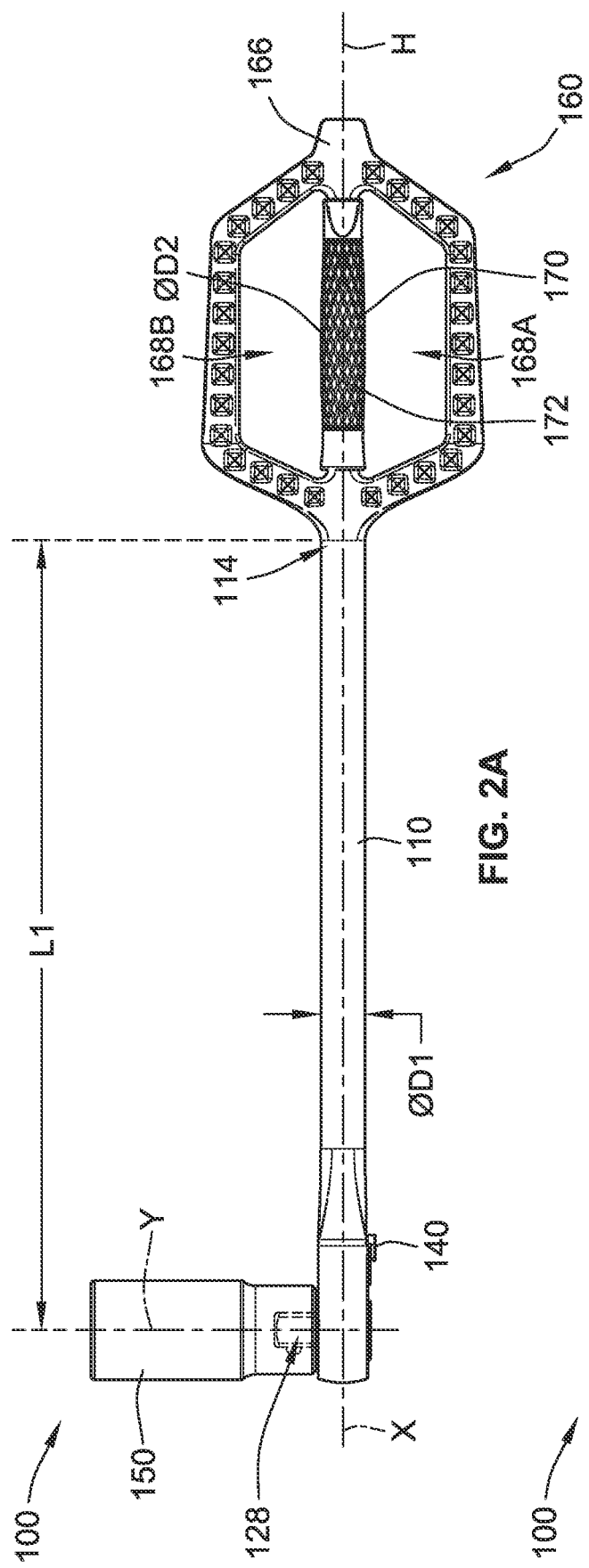
FIG. 2A is a top view of the device of FIG. 1, according to some aspects of the present disclosure.
Figure 2B:
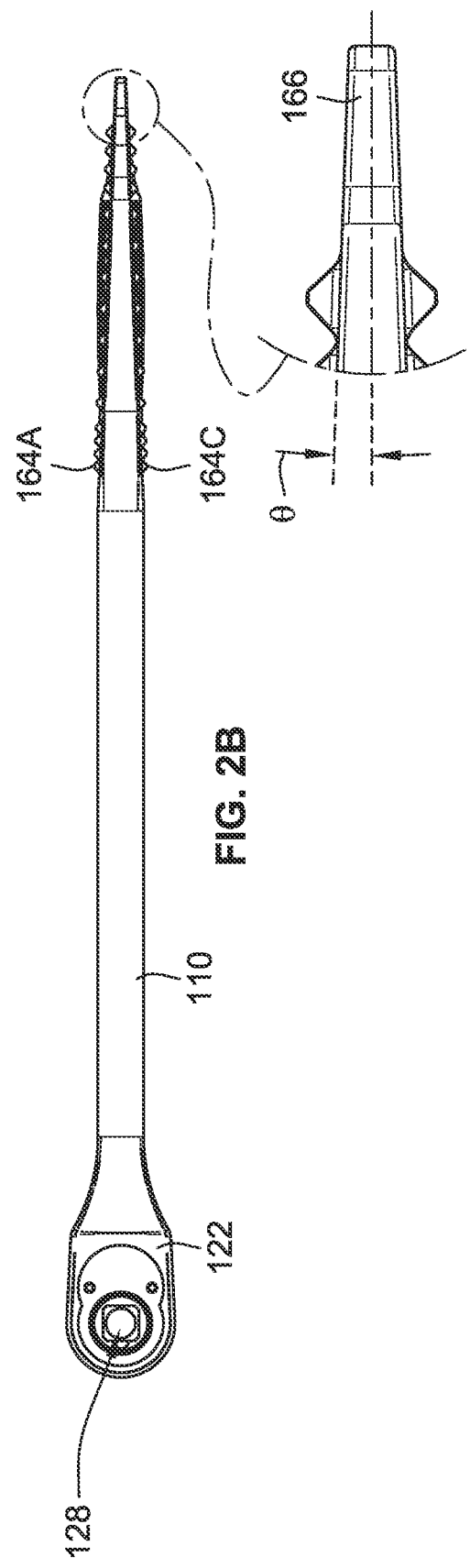
FIG. 2B is a side view of the device of FIG. 1, according to some aspects of the present disclosure.
Figure 3:
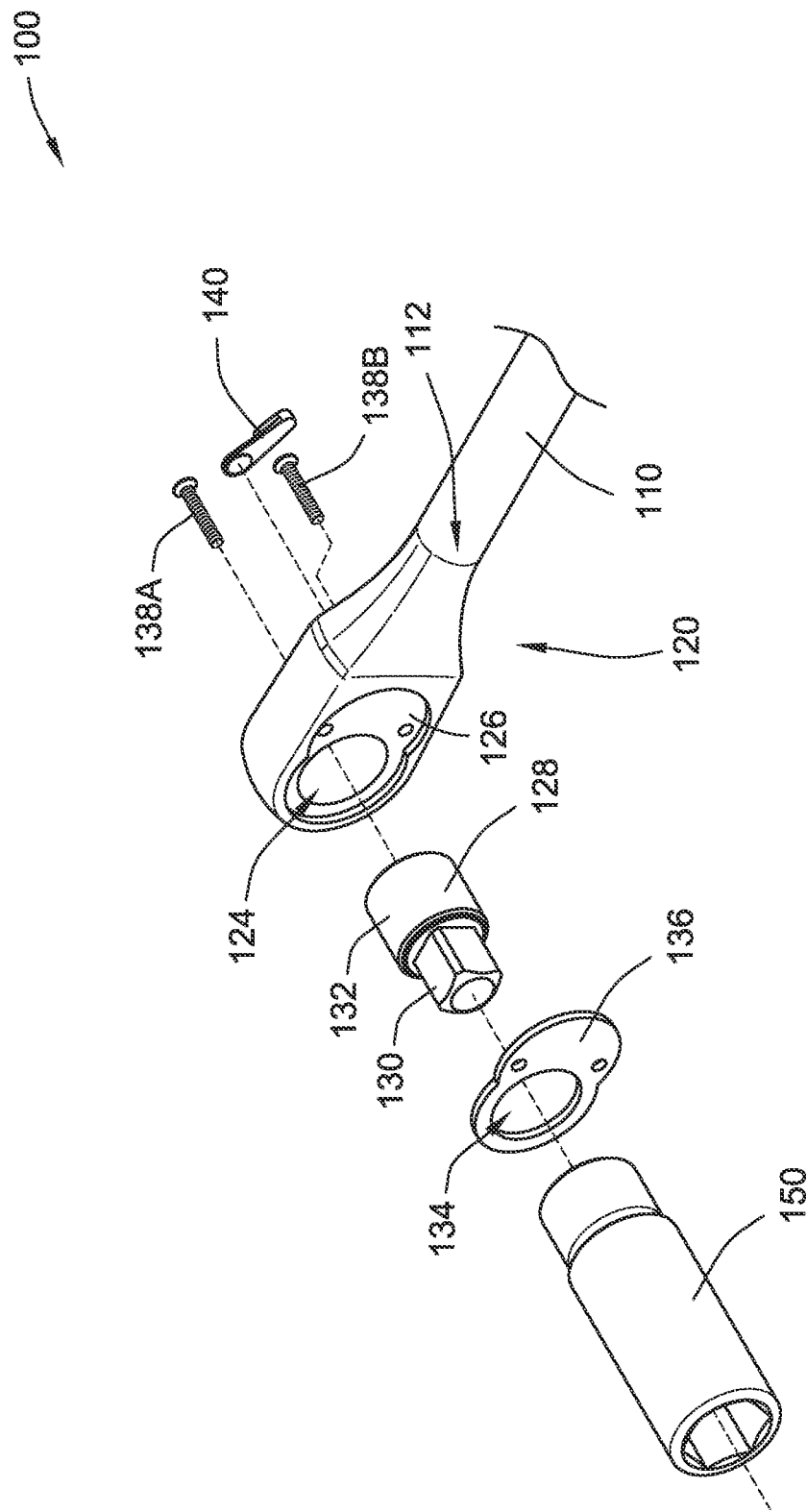
FIG. 3 is an exploded view of the device of FIG. 1, according to some aspects of the present disclosure.

Referring to FIGS. 1-3, a device 100 according to some implementations of the present disclosure is illustrated. As described herein, the device 100 can be used, for example, to change a vehicle tire/wheel. The device 100 includes an elongated shaft 110, a wrench portion 120, a socket 150, and a lever portion 160.

The elongated shaft 110 includes a first end 112 and a second end 114. The elongated shaft 110 has a generally cylindrical cross-sectional shape. The first end 112 of the elongated shaft 110 is coupled to the wrench portion 120. The second end 114 of the elongated shaft is coupled to the lever portion 160. As shown in FIG. 2A, the elongated shaft 110 has a longitudinal axis X.

As shown in FIG. 1, the wrench portion 120 includes a head 122 and a socket 150. The socket 150 is configured to engage a fastener (e.g., the fastener 504 shown in FIG. 5A). More specifically, the socket 150 includes an opening 152 configured to receive at least a portion of the fastener therein. As shown in FIG. 2A, the socket 150 includes a longitudinal axis Y that is generally perpendicular to the longitudinal axis X of the elongated shaft 110.

The lever portion 160 includes a foot pedal 162 and a hand grip 170. The foot pedal 162 includes a first portion 162A and a second portion 162B. The lever portion 160 further includes a first opening 168A and a second opening 168B. The first opening 168A is formed between the first portion 162A of the foot pedal 162 and the hand grip 170. The second opening 168B is formed between the second portion 162B of the foot pedal 162 and the hand grip 170. As described in further detail herein, the first opening 168A and the second opening 168B allow a user of the device 100 to position their hand within the lever portion 160 to grip the hand grip 170.

In some implementations, the first portion 162A of the foot pedal 162 includes a first plurality of protrusions 164A and the second portion 162B of the foot pedal 162 includes a second plurality of protrusions 164B. The first plurality of protrusions 164A are generally positioned in a line along the first portion 162A (e.g., equally spaced) and have a generally pyramid-shaped profile. In the non-limiting example shown in FIG. 1, the first plurality of protrusions 164A includes 15 protrusions, although the first plurality of protrusions 164A can more generally include any suitable number of protrusions (e.g., 5, 10, 20, 50, etc.). The first plurality of protrusions 164A is configured to aid in maintaining engagement between the foot of the user (e.g., as shown in FIG. 5B) and the foot pedal 162. In other words, the first plurality of protrusions 164A can act as a non-slip, anti-slip, and/or non-skid surface for a foot/shoe of a user of the device 100. Further, the grip provided to the user by the first plurality of protrusions 164A is advantageous to the user when the user is changing a tire in inclement weather. Inclement weather poses a risk that the user can slip when applying the foot force due to rain, snow, ice, etc. The first plurality of protrusions 164A aid in preventing slippage by providing the user a surface that has improved grip. The second plurality of protrusions 164B is the same as, or similar to, the first plurality of protrusions 164A.

As shown in FIGS. 1-2B, the first plurality of protrusions 164A and second plurality of protrusions 164B are unitary and/or monolithic with the first portion 162A and second portion 162B. Alternatively, the first plurality of protrusions 164A and second plurality of protrusions 164B can be separate and distinct and coupled to the first portion 162A and/or second portion 162B. In other implementations, the foot pedal 162 can additionally or alternatively include one or more non-slip or non-skid grip pads or tape to aid in maintaining engagement between the foot of the user and the foot pedal 162.

In some implementations, the lever portion 160 of the device includes a first plurality of protrusions 164A, a second plurality of protrusions 164B, a third plurality of protrusions 164C, and a fourth plurality of protrusions (not shown). The third plurality of protrusions 164C and the fourth plurality of protrusions (not shown) are the same as, or similar to, the first plurality of protrusions 164A or the second plurality of protrusions 164B.

Figure 5A:
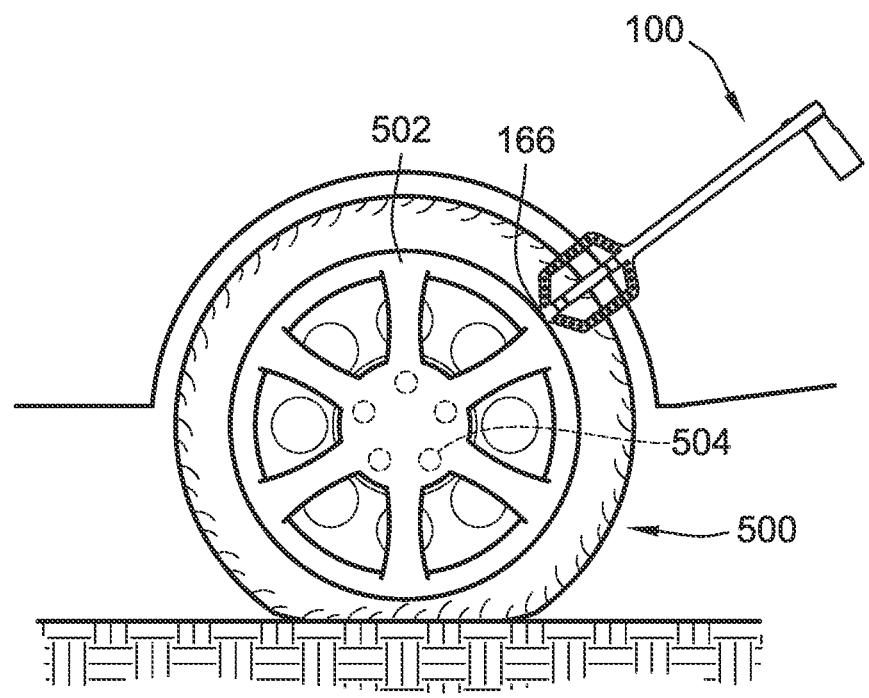
FIG. 5A is a side view of a device and a vehicle wheel including a hubcap, according to some aspects of the present disclosure.
Figure 5B:
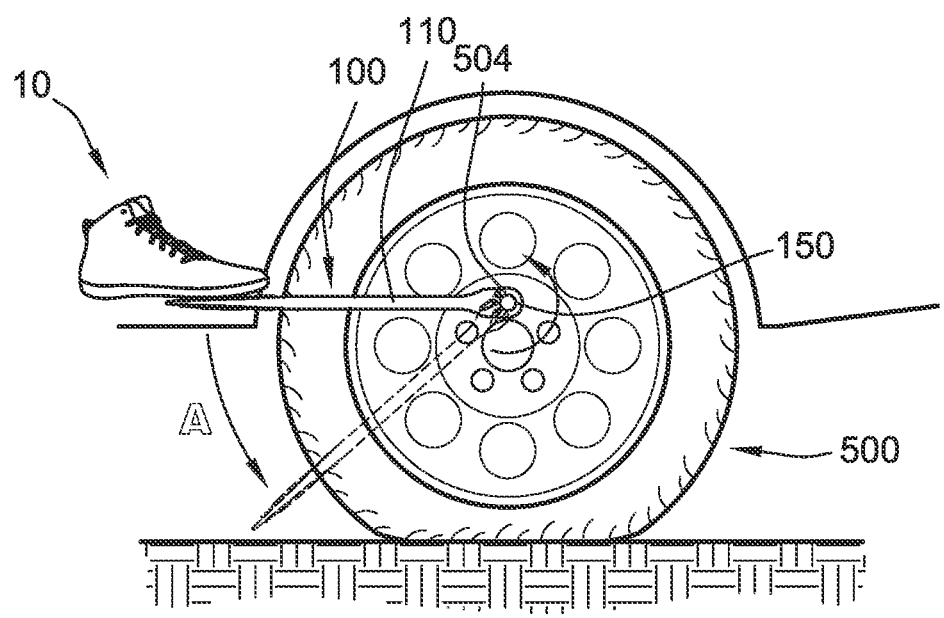
FIG. 5B is a side view of the device and vehicle wheel of FIG. 5A with a force applied via a foot of a user to apply a first torque to a lug nut, according to some aspects of the present disclosure.
Figure 5C:
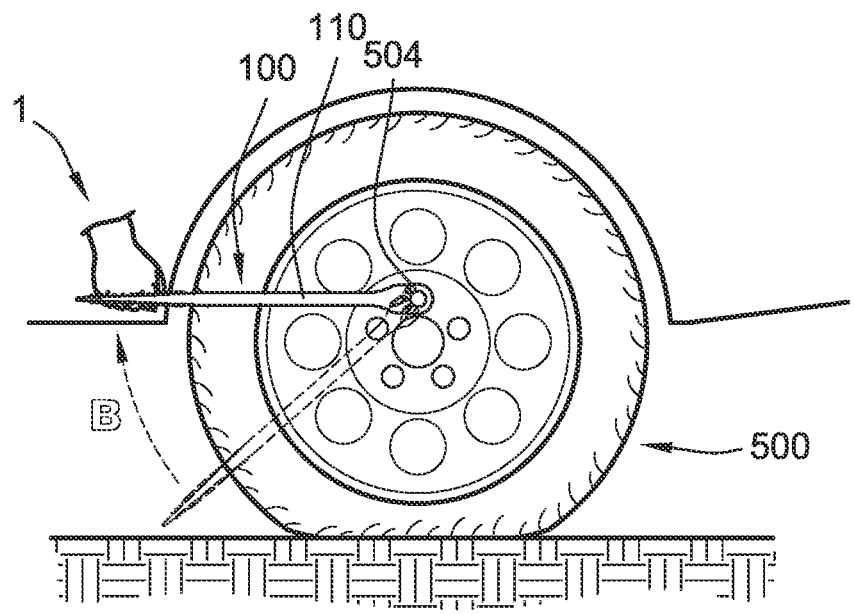
FIG. 5C is a side view of the device and vehicle wheel of FIG. 5A with a force applied via a hand of a user, according to some aspects of the present disclosure.
Figure 5D:
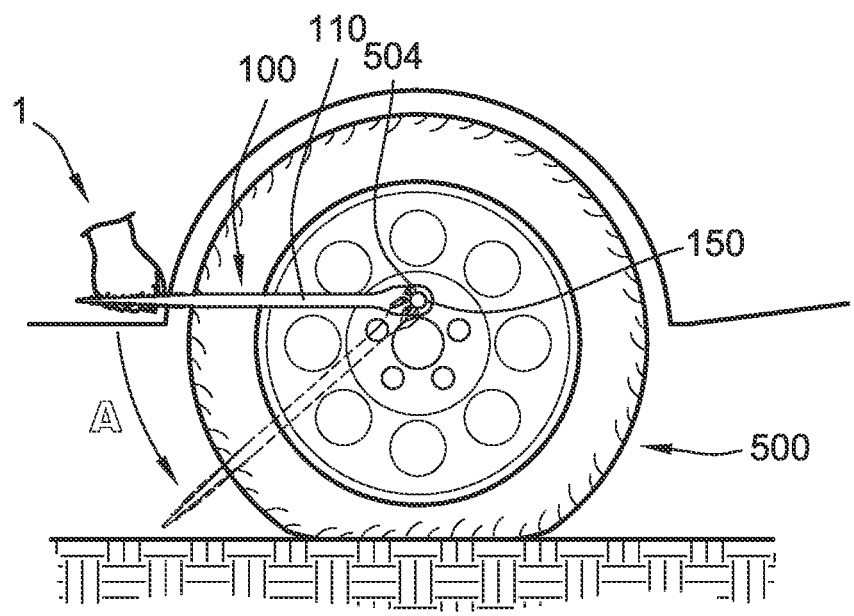
FIG. 5D is a side view of the device and vehicle wheel of FIG. 5A with a force applied via the hand of the user to apply a second torque to the lug nut, according to some aspects of the present disclosure.

As shown in FIG. 2B, the third plurality of protrusions is positioned on the first portion 162A of the foot pedal 162, opposite the first plurality of protrusions 164A. Similarly, the fourth plurality of protrusions (not shown) is positioned on the second portion 162B of the foot pedal 162, opposite the second plurality of protrusions 164B. This placement of the third plurality of protrusions 164C relative to the first plurality of protrusions 164A allows for the user to have a gripping surface when applying the foot force to the device 100 in either direction or orientation (as best shown in FIGS. 5B and 5G). The placement of the fourth plurality of protrusions (not shown) relative to the second plurality of protrusions 164B is the same as, or similar to, the placement of the third plurality of protrusions 164C relative to the first plurality of protrusions 164A.

Referring back to FIG. 1, the elongated shaft 110, the head 122 of the wrench portion 120, and the lever portion 160 are unitary and or/monolithic. Alternatively, in some implementations, one or more of the elongated shaft 110, the head 122 of the wrench portion 120, and the lever portion 160 can be separate and distinct components and that are coupled together (e.g., fastened, welded, etc.) to form the device 100.

The lever portion 160 includes a shim 166. The shim 166 is positioned on an end of the lever portion 160 that is opposite the end of the lever portion 160 coupled to the second end 114 of the elongated shaft 110. As best shown in FIG. 2B, the shim 166 has a tapered shape and is generally used to aid in removing a hubcap from a vehicle wheel (e.g., the hubcap 502 shown in FIG. 5A). The first portion 162A, the second portion 162B, and the shim 166 are inwardly tapered along their length extending away from the end of the lever portion 160 coupled to the elongated shaft 110. The angle θ of the taper of the first portion 162A, the second portion 162B, and the shim 166 is about 5° to about 45° (e.g., about 15°).

Referring to FIG. 2A, the device 100 has a length L1 that is measured between the longitudinal axis Y of the socket 150 and the second end 114 of the elongated shaft 110. Generally, the length L1 is selected to be long enough to prevent contact of the lever portion 160 of the device 100 with the vehicle wheel. In some implementations, the length L1 is at least about 11 inches, at least about 12 inches, at least about 13 inches, at least about 14 inches, etc. to aid in preventing the lever portion 160 of the device 100 from contacting the vehicle wheel responsive to rotation of the elongated shaft 110 when the socket 150 is engaged with the fastener. The length L1 can be selected based on the size of the vehicle wheel desired to be changed using the device 100. For example, if the vehicle wheel is 20 inches in diameter, the length L1 could be at least about 11 inches, at least about 12 inches, at least about 13 inches, etc. As another example, if vehicle wheel is 26 inches in diameter, the length L1 could be at least about 14 inches, at least about 15 inches, at least about 16 inches, etc.

Still referring to FIG. 2A, the hand grip 170 of the device 100 has a generally cylindrical shape. The hand grip 170 has a longitudinal axis H that is generally coincident or parallel with the longitudinal axis X of the elongated shaft 110. The hand grip 170 can include a textured surface 172 that aids the user in gripping the hand grip 170.

The lever portion 160 has a generally hexagonal shape. Further, the first opening 168A and the second opening 168B of the lever portion 160 each have a generally trapezoidal shape. The trapezoidal shape allows for the hand of the user to be inserted into the openings 168A and 168B so that the user can grasp the hand grip 170. Alternatively, the lever portion 160 can have a circular shape or a polygonal shape. The shape of the lever portion 160 is designed to allow a user to position a foot on the foot pad 162 of the lever portion 160. Similarly, the first opening 168A can alternatively have a circular shape while the second opening 168B can have a polygonal shape, or the first opening 168A and the second opening 168B can both have circular shapes or polygonal shapes. The shape of first opening 168A and the second opening 168B is designed to allow a user to grasp the hand grip 170 of the device 100.

Referring to FIG. 3, in some implementations, the head 122 of the wrench portion 120 includes an opening 124, an indent 126, a drive head 128, and a retaining plate 136. The drive head 128 includes a curved surface 132 and a bit 130. The retaining plate 136 includes an opening 134 which is configured to engage the curved surface 132 of the drive head 128. The retaining plate 136 secures the drive head 128 such that the curved surface 132 is positioned within the opening 124. The retaining plate 136 is secured to the head 122 via a plurality of fasteners 138A and 138B at indent 126. The bit 130 of the drive head 128 engages the socket 150 and allows the socket 150 to apply a torque onto a fastener (e.g., the fastener 504 in FIGS. 5A-5G).

Figure 5E:
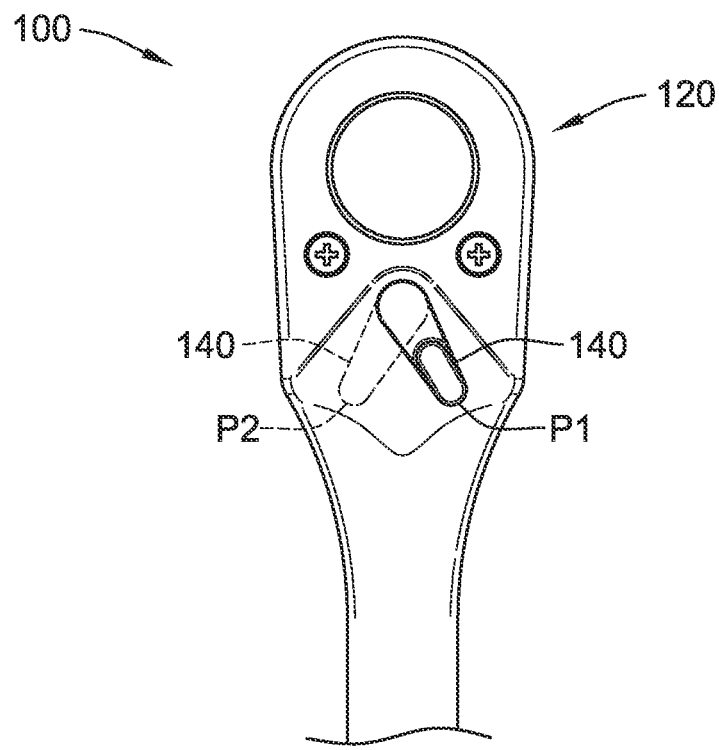
FIG. 5E is a partial side view of the device of FIG. 5A including a lever of a ratchet head that is moveable from a first position to a second position, according to some aspects of the present disclosure.

The head 122 of the wrench portion 120 can further include a lever 140 that is moveable between a first position P1 (FIG. 5E) and a second position P2 (FIG. 5E). When the lever 140 is in the first position P1 (FIG. 5E), the elongated shaft is permitted to rotate in a first rotational direction and a second rotational direction that is opposite the first rotational direction; however, when the lever 140 is in the first position P1, the socket 150 can apply a first torque or a second torque in the first rotational direction only, and not the second rotational direction. Conversely, when the lever 140 is in the second position P2, the elongated shaft is permitted to rotate in the first rotational direction and the second rotational direction; however, when the lever 140 is in the second position P2, the socket 150 can apply a first torque or a second torque in the second rotational direction only, and not the first rotational direction.

Figure 4:
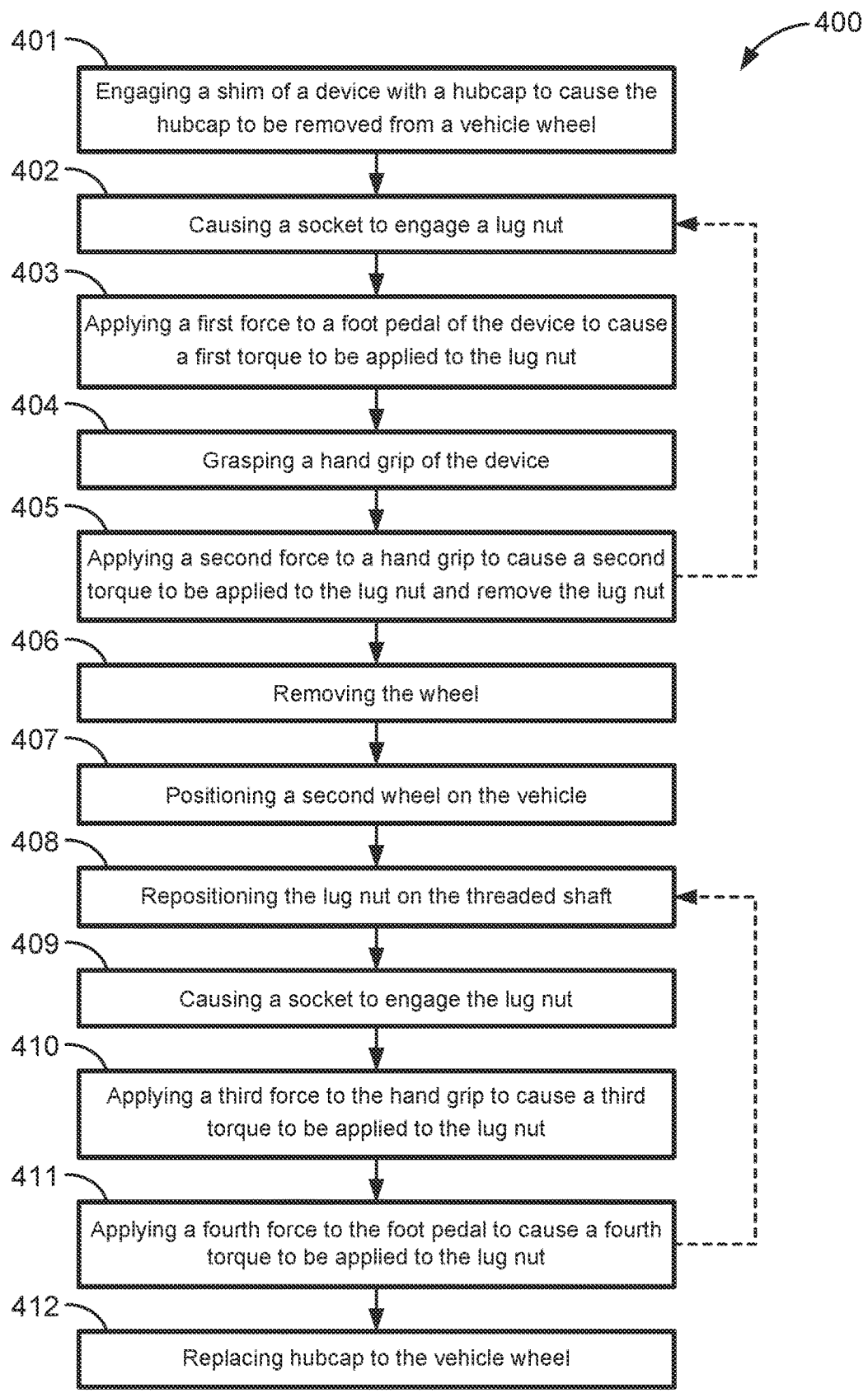
FIG. 4 is a process flow diagram for a method of changing a vehicle wheel, according to some aspects of the present disclosure.

Referring to FIG. 4, a method 400 for changing a vehicle wheel according to some implementations of the present disclosure is illustrated. One or more steps or aspects of the method 400 can be implemented using a device that is the same as, or similar to, the device 100 described herein.

Many vehicle wheels include a hubcap that needs to be removed to access the lug nuts of the vehicle wheel. In some implementations, the method 400 optionally includes step 401, which includes engaging a shim of a lever portion of the device with the hubcap to cause the hubcap to be removed from the vehicle wheel. For example, if the vehicle wheel requires hubcap removal to access a lug nut, the user performs step 401 to remove the hubcap by engaging the shim of the lever portion of the device with the hubcap to disengage the hubcap from the vehicle wheel. The hubcap will then be removed from the vehicle wheel. If, for example, the vehicle wheel provides the user with access to the lug nuts without having to remove the hubcap, step 401 of the method 400 can be skipped.

Referring to FIG. 5A, a vehicle wheel 500 is deflated and needs to be replaced. The vehicle wheel 500 includes a hubcap 502 and a plurality of lug nuts 504. In this example, the hubcap 502 is configured onto the vehicle 500 in a manner in which the lug nuts 504 are hidden behind the hubcap 502. Therefore, the hubcap 502 must be removed for a user to have access to the lug nuts 504. To remove the hubcap 502, the shim 166 of the device 100 is configured to engage the hubcap 502. The shim 166 is positioned onto the outer edge of the hubcap 502 so the shim 166 can be inserted between the hubcap 502 and the vehicle wheel 500. Once the shim 166 is inserted between the hubcap 502 and the vehicle wheel 500, the shim can be used to release the hubcap 502 from the vehicle wheel 500. The hubcap 502 is then removed and the user has access to the lug nuts 504.

In the exemplary embodiment shown in FIG. 5A, the vehicle wheel 500 includes five lug nuts 504. The implementation disclosed in FIG. 5A is not intended to limit the amount of lug nuts 504 that the vehicle wheel 500 could include. The methods disclosed herein, including the method 400 (FIG. 4) and FIGS. 5A-5G, can be performed if the vehicle wheel 500 has four lug nuts, five lug nuts, six lugs nuts, etc., according to some aspects of the present disclosure.

Step 402 of the method 400 includes causing a socket of a wrench portion of the device to engage a first lug nut. The first lug nut engages a first threaded shaft on a portion of the vehicle. The first lug nut aids in coupling a first wheel to the vehicle. For example, a user can grasp the hand grip 170 of the device 100 by inserting a hand through the first opening 168A and the second opening 168B. The user can then position their hand on the socket 150 of the device 100 and position the socket 150 such the opening 152 of the socket 150 engages the first lug nut.

Modern vehicle wheels typically contain at least one lug nut that is a locking lug nut which requires a specially designed socket to remove. The locking lug nuts are intended to prevent a person other than the vehicle owner or other authorized party from removing the vehicle wheel. Therefore, according to some implementations of the present disclosure, the socket 150 of the device 100 may need to be removed and replaced with a socket specially designed for a particular lug nut (sometimes referred to as a wheel lock). For example, if the lug nut has a unique geometry, an ordinary socket would not be capable of removing the lug nut. To remove such a lug nut, the user requires a specially designed socket that corresponds to the unique geometry of the lug nut. The user can replace socket 150 with the specially designed socket and position the specially designed socket onto device 100. The user can than proceed and follow the subsequent steps of the method to successfully remove the locking lug nut from the vehicle wheel.

Step 403 of the method 400 includes applying a first force to a foot pedal of the lever portion of the device. The first force will cause a first torque to be applied to the first lug nut. The first torque will cause the first lug nut to rotate in a first rotational direction. According to some aspects of the present disclosure, the objective of step 403 is to initially loosen the lug nut.

For example, referring to FIG. 5B, the lug nut 504 is exposed following removal of the hubcap 502 (FIG. 5A), according to some aspects of the present disclosure. The user then causes the socket 150 of the device 100 to engage a lug nut 504 that secures the vehicle wheel 500 onto a vehicle. The user positions the socket 150 of the device 100 such that the lever portion 160 (FIGS. 1-2A) of the device 100 extends beyond the vehicle wheel 500. The user then applies a first force to the foot pedal 162 of the device 100. The first force is applied via a foot 10 of the user. Once the first force is applied, the socket 150 applies a first torque to the lug nut 504 in a first rotational direction A. The first force and first torque cause the elongated shaft 110 of the device 100 and the lug nut 504 to rotate in the first rotational direction A, as shown in FIG. 5B.

According to some aspects of the present disclosure, the first force applied via the foot 10 of the user is sufficient to cause rotation of the lug nut 504 in the first rotational direction A. The present disclosure is not intended to limit the number of instances the first force is applied to the foot pedal 142 (FIG. 1) of the device 100. The first force could be applied once, twice, three times, etc. until the first torque causes the lug nut 504 to rotate in the first rotational direction A.

Typically, the first rotational direction A is the counter-clockwise direction because most fasteners and lug nuts loosen when rotated in the counter-clockwise direction. The implementation disclosed in step 403 is not intended to limit the orientation of the first rotational direction. In some circumstances, the first rotational direction may be clockwise rather than counter-clockwise. For example, the lug nut could require a clockwise rotation for the lug nut to loosen with respect to the threaded shaft.

Step 404 of the method 400 further includes subsequent to causing the first lug nut to rotate, grasping a hand grip of the lever portion of the device by inserting a hand through a first opening and a second opening of the lever portion. For example, as best shown in FIG. 1, to grasp the hand grip 170 of the device 100, the user must insert their fingers through the second opening 168B and their thumb through the first opening 168A. This would allow the user access to grasp the hand grip 170 with the user's hand. Conversely, the user can also insert their fingers through the first opening 168A and their thumb through the second opening 168B. Whether the user inserts their fingers through the first opening 168A or the second opening 168B depends on the orientation of the lug nut relative to the vehicle wheel, whether the user is loosening or tightening the lug nut, and whether the user is right or left handed.

Prior to performing step 405, the user repositions the device such that it is in a position where a torque can be applied onto the lug nut. Referring to FIG. 5C, the elongated shaft 110 of the device 100 and the lug nut 504 have been rotated following the application of the first force to the foot pedal 162 (FIG. 1), according to some aspects of the present disclosure. The user pulls on the hand grip 170 (FIG. 1) of the device 100 to cause the elongated shaft 110 to rotation in the second rotational direction B. When the elongated shaft 110 rotates in the second rotational direction B, the lug nut 504 is not rotated in the second rotational direction B. In other words, the lug nut 504 maintains its position. The lug nut 504 is not rotated due to the head 122 of the wrench portion of the device 100 discussed with respect to FIG. 3 above and FIG. 5E below.

Step 405 of the method 400 further includes applying a second force to the hand grip of the lever portion of the device. The second force will cause a second torque to be applied to the first lug nut. The second torque will cause the first lug nut to be further rotated in the first rotational direction and, ultimately, removed from the first threaded shaft. The second force and the second torque are less than the first force and the first torque, respectively.

For example, referring to FIG. 5D, with the hand grip 170 (FIG. 1) still grasped by the user, the user applies the second force onto the hand grip 170 (FIG. 1) of the device 100, according to some aspects of the present disclosure. The second force is applied via a hand 1 of the user and causes the socket 150 of the device 100 to apply a second torque onto the lug nut 504. The second torque causes the elongated shaft 110 of the device 100 and the lug nut 504 to be further rotated in the first rotational direction A.

According to some aspects of the present disclosure, the objective of step 405 is to further loosen the first lug nut and ultimately remove the first lug nut from the vehicle wheel. Once the user has initially loosened the first lug nut at step 403, the user can repeatedly apply the second force to the hand grip which causes the second torque to be applied to the first lug nut. Step 405 of method 400 will require the user to exert less force and energy than step 403 because at step 405 the first lug nut is not fully tightened to the first threaded shaft. The user can pull on the hand grip to cause the device to rotate in the second rotational direction without causing rotation of the socket or the lug nut. The user then can apply the second force to the hand grip and pull on the hand grip as many times as needed to remove the lug nut.

For example, according to some aspects of the present disclosure and as discussed with respect to FIG. 5C, the user pulls on the hand grip 170 (FIG. 1) of the device 100 to cause the elongated shaft 110 to rotate in the second rotational direction B without causing rotation of the lug nut 504. The user then reapplies the second force to the hand grip 170 (FIG. 1) which causes the second torque to further rotate the elongated shaft 110 and the lug nut 504 in the first rotational direction A as discussed with respect to FIG. 5D. The user repeats these actions until the lug nut 504 is removed from the vehicle wheel 500.

According to some aspects of the present disclosure, the method 400 starting from step 402 and ending at step 405 can be repeated one or more times as needed for all of the lug nuts to be removed. For example, if the vehicle wheel has five lug nuts, step 402 through step 405 will be repeated five times. At step 402 of the second repetition, the method 400 includes causing the socket of the wrench portion of the device to engage a second lug nut which engages a second threaded shaft on a portion of the vehicle. At step 403 of the second repetition, the method 400 includes applying the first force to the foot pedal which cause the first torque to be applied to the second lug nut. The first torque will cause the second lug nut to rotate in the first rotational direction. At step 404 of the second repetition, the method 400 includes grasping the hand grip by inserting a hand through the first and second opening. At step 405 of the second repetition, the method 400 includes applying the second force to the hand grip which causes the second torque to be applied to the second lug nut. The second torque will cause the second lug nut to be further rotated in the first rotational direction and ultimately removed from the second threaded shaft. Step 402 through step 405 can then be repeated to remove (i) the third lug nut from the third threaded shaft, (ii) the fourth lug nut from the fourth threaded shaft, and (iii) the fifth lug nut from the fifth threaded shaft, or until all lug nuts are removed.

At step 406, subsequent to removing the lug nuts from the respective threaded shafts, the method 400 further includes removing the first wheel from the vehicle. At step 407, subsequent to removing the first wheel from the vehicle, the method 400 further includes positioning a second wheel adjacent to the first threaded shaft.

At step 408, subsequent to positioning a second wheel adjacent to the first threaded shaft, the method 400 further includes repositioning the first lug nut on the first threaded shaft. Subsequent to repositioning the first lug nut on the first threaded shaft, the user can switch the lever of the ratchet head from the first position to the second position which allows the device to rotate in the second rotational direction without causing the socket to rotate relative to the first lug nut when the socket is engaged with the first lug nut.

For example, referring to FIG. 5E, the user switches the position of the lever 140 of the head 122 from a first position P1 to a second position P2. When the lever 140 is in the first position P1, the drive head 128 (FIG. 3) is configured to cause the socket 150 (FIG. 3) to apply the first torque and the second torque to the lug nut 504 (FIGS. 5A-5D) responsive to rotation of the elongated shaft 110 in the first rotational direction A. Further, the drive head 128 (FIG. 3) is configured to permit the elongated shaft 110 to rotate in a second rotational direction B (FIG. 5C) without causing rotation of the socket 150 (FIG. 3) relative to the lug nut 504 when the socket 150 is engaged with the lug nut 504 (FIGS. 5A-5D). Conversely, when the lever 140 is in the second position P2, the drive head 128 (FIG. 3) is configured to cause the socket 150 (FIG. 3) to apply a third torque and a fourth torque to the lug nut 504 (FIGS. 5A-5D) responsive to rotation of the elongated shaft 110 in the second rotational direction B. The drive head 128 (FIG. 3) is configured to permit the elongated shaft 110 to rotate in the first rotational direction A without causing rotation of the socket 150 (FIG. 3) relative to the lug nut 504 when the socket 150 is engaged with the lug nut 504.

Step 409 of the method 400 includes causing the socket of the wrench portion of the device to engage the first lug nut. At step 410, the method 400 further includes applying a third force to the hand grip of the device. The third force will cause a third torque to be applied to the first lug nut. The third torque will cause the first lug nut to rotate in a second rotational direction that is opposite the first rotational direction. According to some aspects of the present disclosure, the objective of step 410 is to secure and tighten the first lug nut onto the first threaded shaft.

Figure 5F:
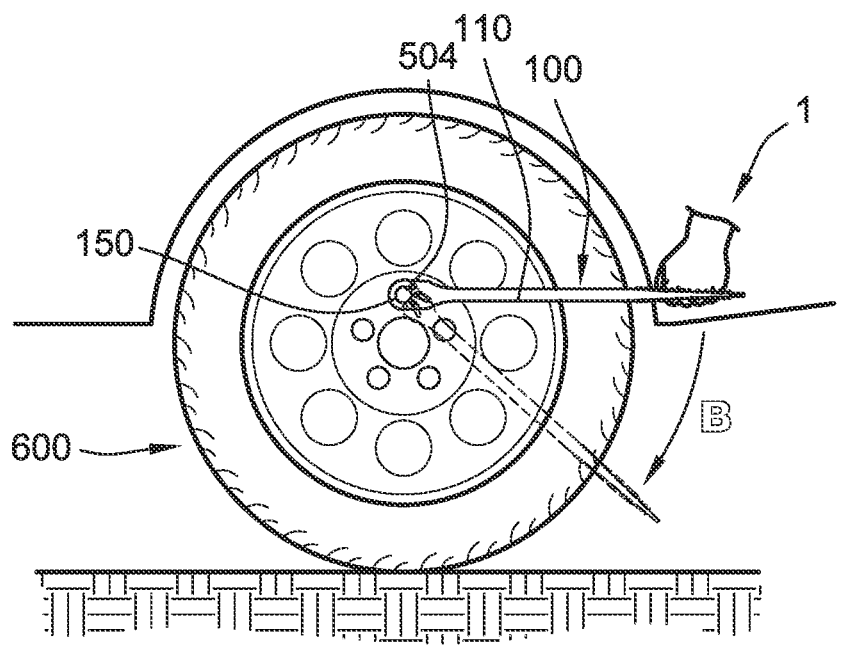
FIG. 5F is a side view of the device of FIG. 5A and a second vehicle wheel and a force applied via the hand of a user to apply a third torque to the lug nut, according to some aspects of the present disclosure.
Figure 5G:
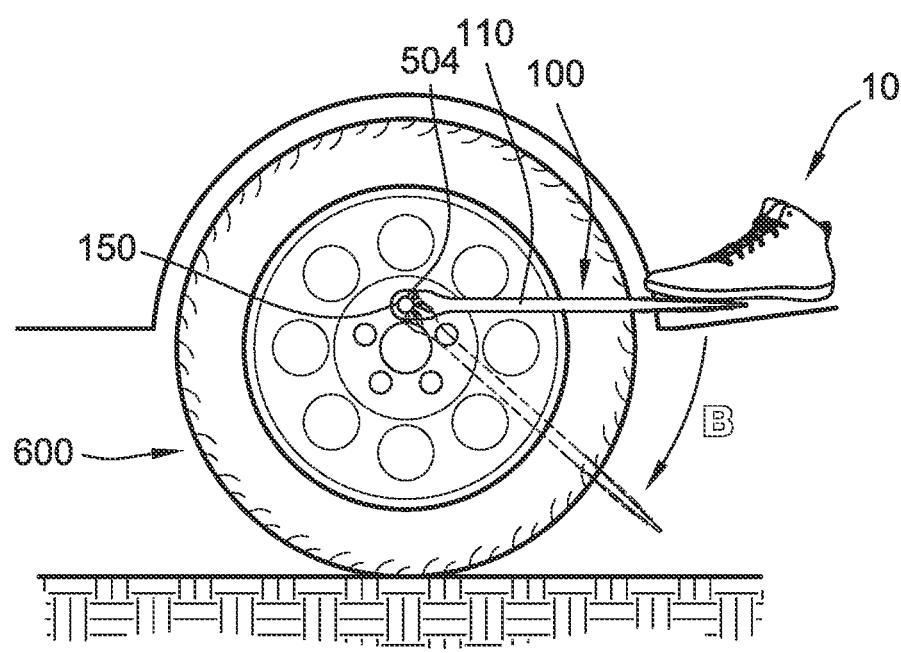
FIG. 5G is a side view of the device of FIG. 5A and a force applied via the foot of the user to apply a fourth torque to the lug nut, according to some aspects of the present disclosure.

For example, referring to FIG. 5F, the deflated vehicle wheel 500 is replaced with an inflated vehicle wheel 600, according to some aspects of the present disclosure. The user causes the socket 150 of the device 100 to engage a lug nut 504 that secures the vehicle wheel 600 onto the vehicle. The user positions the socket 150 of the device 100 such that the lever portion 160 (FIG. 1) of the device 100 extends beyond the vehicle wheel 600. The user then grasps the hand grip 170 (FIG. 1) of the device 100, as discussed with respect to FIG. 5C. With the hand grip 170 (FIG. 1) grasped by the user, the user applies the third force onto the hand grip 170 (FIG. 1) of the device 100. The third force is applied via a hand 1 of the user and causes the socket 150 of the device 100 to apply a third torque onto the lug nut 504. The third torque causes the elongated shaft 110 of the device 100 and the lug nut 504 to be rotated in the second rotational direction B.

According to some aspects of the present disclosure, the objective of step 410 is to tighten the first lug nut until it is ultimately secured onto the vehicle wheel. Once the user has initially tightened the first lug nut at step 410, the user can repeatedly apply the third force to the hand grip which causes the third torque to be applied to the first lug nut. To apply the third force more than once, the user can pull on the hand grip to cause the device to rotate in the first rotational direction without causing rotation of the socket or the lug nut. The user can then apply the third force to the hand grip and pull on the hand grip as many times as it is required to tighten the lug nut.

For example, according to some aspects of the present disclosure, the user will pull on the hand grip 170 (FIG. 1) of the device 100 to cause the elongated shaft 110 of the device 100 to rotation in the first rotational direction A. When the elongated shaft 110 rotates in the first rotational direction A, the lug nut 504 is not rotated in the first rotational direction A. In other words, the lug nut 504 maintains its position. The lug nut 504 is not rotated due to the head 122 of the device 100 discussed with respect to FIG. 3 and FIG. 5E. The user will then reapply the third force to the hand grip 170 (FIG. 1) which causes the third torque to further rotate the elongated shaft 110 and the lug nut 504 in the second rotational direction B. The user will repeat these actions until the lug nut 504 is tightened onto the vehicle wheel 600.

Typically, the second rotational direction is a clockwise direction because most fasteners and lug nuts tighten when rotated in the clockwise direction. The implementation disclosed in step 410 is not intended to limit the orientation of the second rotational direction. In some circumstances, the second rotational direction may be counter-clockwise rather than clockwise. For example, the lug nut could require a counter-clockwise rotation for the lug nut to tighten with respect to the threaded shaft.

Step 411 of the method 400 further includes subsequent to applying the third force, applying a fourth force to the foot pedal of the lever portion of the device. The fourth force will cause a fourth torque to be applied to the first lug nut. The fourth torque will cause the first lug nut to be further rotated in the second rotational direction. The fourth force and the fourth torque are greater than the third force and the third torque, respectively. Subsequent to application of the fourth force, the first lug nut will be securely tightened onto the first threaded shaft.

For example, referring to FIG. 5G, the user applies a fourth force to the foot pedal 162 (FIG. 1) of the device 100, according to some aspects of the present disclosure. The fourth force is applied via a foot 10 of the user. Once the fourth force is applied, the socket 150 applies a fourth torque to the lug nut 504 in the second rotational direction B. The fourth torque causes the elongated shaft 110 of the device 100 and the lug nut 504 to be further rotated in the second rotational direction and causes the lug nut 504 to be securely tightened onto the vehicle wheel 600.

According to some aspects of the present disclosure, step 411 of method 400 is optional because the first lug nut may already be securely tightened to the first threaded shaft subsequent to application of the third force in step 410. For example, if, subsequent to application of the third force in step 410, the first lug nut is securely tightened onto the first threaded shaft, the application of the fourth force in step 411 is unnecessary. However, if, for example, subsequent to application of the third force in step 410, the first lug nut is not securely tightened onto the first threaded shaft, the application of the fourth force in step 411 is necessary to securely tighten the first lug nut onto the first threaded shaft. According to some aspects of the present disclosure, the first lug nut may need additional force than the user can provide when applying the third force in step 410. This depends on the strength of the user and the condition of the first lug nut. For example, if the first lug nut is rusty or has other imperfections, the third force in step 410 may not be sufficient to securely tighten the first lug nut onto the first threaded shaft. In such a situation, the application of the fourth force in step 411 is necessary to securely tighten the first lug nut onto the first threaded shaft.

According to some aspects of the present disclosure, the method 400 starting from step 408 and ending at step 411 can be repeated one or more times as needed for all of the lugs nuts to be securely tightened onto the respective threaded shafts. For example, if the vehicle wheel has five lug nuts, step 408 through step 411 will be repeated five times. At step 408 of the second repetition, the method includes repositioning a second lug nut onto the second threaded shaft. At step 409 of the second repetition, the method 400 includes causing the socket of the wrench portion of the device to engage a second lug nut. At step 410 of the second repetition, the method 400 includes applying the third force to the hand grip of the device which causes the third torque to be applied to the second lug nut. The third torque will cause the second lug nut to rotate in the second rotational direction. At step 411 of the second repetition, the method 400 includes applying a fourth force to the foot pedal of the lever portion of the device which causes the fourth torque to be applied to the second lug nut. The fourth torque will cause the second lug nut to be further rotated in the second rotational direction and to be securely tightened onto the second threaded shaft. Step 408 through step 411 can then be repeated to securely tighten (i) the third lug nut onto the third threaded shaft, (ii) the fourth lug nut onto the fourth threaded shaft, and (iii) the fifth lug nut onto the fifth threaded shaft, or until all lug nuts are securely tightened.

Step 412 of the method 400 further includes reengaging the hubcap onto the vehicle wheel. Step 412 is optional because it depends on whether the hubcap was removed in step 401. If the hubcap was not removed in step 401, then step 412 is unnecessary. If, for example, the hubcap was removed to provide the user access to the lug nuts on the vehicle wheel, then step 412 should be performed to replace the hubcap.

One or more elements or aspects or steps, or any portion(s) thereof, from one or more of any of the claims below can be combined with one or more elements or aspects or steps, or any portion(s) thereof, from one or more of any of the other claims or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A device for changing a vehicle wheel, the device comprising:
   an elongated shaft;
   a wrench portion coupled to a first end of the elongated shaft, the wrench portion including a head and a socket, the socket being configured to engage a fastener;
   a lever portion coupled to a second end of the elongated shaft, the lever portion including:
      a foot pedal including a first portion and a second portion, the foot pedal being configured to cause the socket to apply a first torque to the fastener responsive to application of a first force to the foot pedal via a foot of a user, the foot pedal includes a plurality of protrusions configured to aid in maintaining engagement between the foot of the user and the foot pedal,
      a hand grip having a longitudinal axis that is coincident with a longitudinal axis of the elongated shaft and is configured to cause the socket to apply a second torque to the fastener responsive to application of a second force to the hand grip via a hand of the user, the hand grip being positioned within an outer perimeter of the foot pedal and being defined by a plurality of openings that are configured to allow the hand of the user to grasp the hand grip,
      wherein the first portion of the foot pedal includes (i) a first segment adjacent to and extending from the first end of the foot pedal, (ii) a second segment, adjacent to and extending from a second end of the foot pedal, the second end being opposite of the first end, and (iii) a third segment connecting the first segment and the second segment and being substantially parallel to the longitudinal axis of the elongated shaft, wherein a length of the third segment is less than a length measured between the first end and the second end of the foot pedal.

2. The device of claim 1, wherein the head of the wrench portion includes a lever and a drive head configured to couple to the socket, the lever being moveable between a first position and a second position.

3. The device of claim 2, wherein responsive to the lever being in the first position, the drive head is configured to (i) cause the socket to apply the first torque or the second torque to the fastener responsive to rotation of the elongated shaft in a first direction and (ii) permit the elongated shaft to rotate in a second direction opposite the first direction without causing rotation of the socket relative to the fastener when the socket is engaged with the fastener.

4. The device of claim 3, wherein responsive to the lever being in the second position, the drive head is configured to (i) cause the socket to apply the first torque or the second torque to the fastener responsive to rotation of the elongated shaft in the second direction and (ii) permit the elongated shaft to rotate in the first direction without causing rotation of the socket relative to the fastener when the socket is engaged with the fastener.

5. The device of claim 1, wherein the socket includes an opening configured to receive a portion of the fastener therein, wherein a longitudinal axis of the opening is generally perpendicular to the longitudinal axis of the elongated shaft.

6. The device of claim 5, wherein the device has a length measured between the longitudinal axis of the socket and the second end of the elongated shaft that is at least 11 inches to aid in preventing the lever portion of the device from contacting the vehicle wheel responsive to rotation of the elongated shaft.

7. The device of claim 1, wherein the lever portion has a generally hexagonal shape and the first opening and the second opening have a generally trapezoidal shape.

8. The device of claim 1, wherein the head of the wrench portion, the elongated shaft, and the lever portion are unitary and monolithic.

9. The device of claim 1, wherein the lever portion includes a shim configured to aid in removing a hubcap from a vehicle wheel.

10. A method for changing a vehicle wheel using a device comprising an elongated shaft, a wrench portion, and a lever portion, the method comprising:
    causing a socket of the wrench portion of the device to engage a first lug nut that engages a first threaded shaft on a portion of the vehicle for coupling a first wheel to the vehicle;
    applying a first force to a foot pedal of the lever portion of the device via a foot of a user to cause a first torque to be applied to the first lug nut to cause the first lug nut to rotate in a first rotational direction, wherein the foot pedal includes a plurality of protrusions that aid in maintaining engagement between the foot of the user and the foot pedal, wherein the first portion of the foot pedal includes (i) a first segment adjacent to and extending from the first end of the foot pedal, (ii) a second segment, adjacent to and extending from a second end of the foot pedal, the second end being opposite of the first end, and (iii) a third segment connecting the first segment and the second segment and being substantially parallel to the longitudinal axis of the elongated shaft, wherein a length of the third segment is less than a length measured between the first end and the second end of the foot pedal, wherein a hand grip is positioned within an outer perimeter of the foot pedal and being defined by a plurality of openings that are configured to allow the hand of the user to grasp the hand grip;
    subsequent to causing the first lug nut to rotate, grasping, via a hand of the user, a hand grip of the lever portion of the device by inserting a hand through the plurality of openings, wherein the hand grip that is grasped by the hand of the user is coincident with a longitudinal axis of the elongated shaft;
    applying a second force to the hand grip of the lever portion of the device via the hand of the user to cause a second torque to be applied to the first lug nut to cause the first lug nut to be further rotated in the first rotational direction and removed from the first threaded shaft, wherein the second force and the second torque are less than the first force and the first torque;
    subsequent to removing the first lug nut from the first threaded shaft, removing the first wheel from the vehicle;
    subsequent to the removing the first wheel, positioning a second wheel adjacent to the first threaded shaft;
    subsequent to the positioning the second wheel, positioning the first lug nut on the first threaded shaft; and
    causing the socket to engage the first lug nut and applying a third force to the hand grip of the device to cause a third torque to be applied to the first lug nut, thereby causing the first lug nut to rotate in a second rotational direction that is opposite the first rotational direction.

11. The method of claim 10, further comprising, subsequent to applying the third force, applying a fourth force to the foot pedal to cause a fourth torque to be applied to the first lug nut, thereby causing the first lug nut to further rotate in the second rotational direction that is opposite the first rotational direction, wherein the fourth force and the fourth torque are greater than the third force and the third torque.

12. The method of claim 11, wherein a head of the wrench portion includes a lever and a drive head configured to couple to the socket, the lever being moveable between a first position and a second position and further comprising, subsequent to positioning the first lug nut on the first threaded shaft, switching the lever of the ratchet head to the second position to permit the device to rotate in the second rotational direction without causing the socket to rotate relative to the first lug nut when the socket is engaged with the first lug nut.

13. The method of claim 10, wherein the elongated shaft includes a first end and a second end, the wrench portion being coupled to the first end of the elongated shaft, wherein the device has a length measured between a longitudinal axis of the socket and the second end of the elongated shaft that is at least 11 inches to aid in preventing the lever portion from contacting the vehicle wheel responsive to rotation of the elongated shaft.

14. The method of claim 10, further comprising, prior to causing the socket of the wrench portion of the device to engage a first lug nut, engaging a shim of the lever portion with the hubcap to cause the hubcap to be removed from the vehicle wheel.

15. The method of claim 10, further comprising:
subsequent to removing the first lug nut from the threaded shaft, causing the socket of the wrench portion of the device to engage a second lug nut that engages the first threated shaft on the portion of the vehicle to aid in coupling the first wheel to the vehicle;
applying the first force to the foot pedal to cause the first torque to be applied to the second lug nut to cause the second lug nut to rotate in the first rotational direction;
applying the second force to the hand grip to cause the second torque to be applied to the second lug nut to cause the second lug nut to be further rotated in the first rotational direction and removed from the first threaded shaft, wherein the second force and the second torque are less than the first force and the first torque.

16. The method of claim 10, further comprising:
subsequent to removing the first lug nut from the threaded shaft, causing the socket of the wrench portion of the device to engage a second lug nut that engages the first threaded shaft on the portion of the vehicle to aid in coupling the first wheel to the vehicle;
applying the second force to the hand grip to cause the second torque to be applied to the second lug nut to cause the second lug to be rotated in the first rotational direction and removed from the threaded shaft.

* * * * *